(12) United States Patent
Gaechter et al.

(10) Patent No.: US 8,953,417 B2
(45) Date of Patent: Feb. 10, 2015

(54) ELECTROMAGNETIC TIMEPIECE MOTOR AND METHOD OF MANUFACTURING THE SAME

(71) Applicant: ETA SA Manufacture Horlogere Suisse, Grenchen (CH)

(72) Inventors: Philipp Gaechter, Itingen (CH); Marco Bettelini, Preles (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 14/046,139

(22) Filed: Oct. 4, 2013

(65) Prior Publication Data

US 2014/0098646 A1 Apr. 10, 2014

(30) Foreign Application Priority Data

Oct. 8, 2012 (EP) ..................................... 12187676

(51) Int. Cl.
  *G04C 3/00* (2006.01)
  *G04C 3/16* (2006.01)
  *F16C 35/02* (2006.01)
  *F16C 33/20* (2006.01)
  (Continued)

(52) U.S. Cl.
  CPC ............... *G04C 3/008* (2013.01); *F16C 35/02* (2013.01); *F16C 33/20* (2013.01); *G04C 3/14* (2013.01); *H02K 5/08* (2013.01); *H02K 7/083* (2013.01); *H02K 15/16* (2013.01); *G04C 3/16* (2013.01); *H02K 37/16* (2013.01)
  USPC ......... 368/76; 368/88; 368/160; 310/40 MM; 310/43

(58) Field of Classification Search
  USPC .......... 368/76, 80, 88, 157, 160; 310/40 MM, 310/43, 51
  See application file for complete search history.

(56) References Cited

U.S. PATENT DOCUMENTS 4,270,066 A * 5/1981 Terade et al. .......... 310/216.099
4,342,930 A * 8/1982 Pellaton .......................... 310/91
(Continued)

FOREIGN PATENT DOCUMENTS

DE 811 002 8/1951
DE 848 671 9/1952
(Continued)

OTHER PUBLICATIONS

European Search Report issued Mar. 22, 2013, in European Application No. 12187676.7 filed Oct. 8, 2012 (with English Translation).

*Primary Examiner* — Vit W Miska
(74) *Attorney, Agent, or Firm* — Oblon, Spivak, McClelland, Maier & Neustadt, L.L.P.

(57) ABSTRACT

An electronic timepiece movement including a timepiece motor formed by an assembly comprising a frame made of non-magnetic material and a rotor housed in said frame; and method of manufacturing a motor of this type wherein the frame is first made with a lateral aperture, said frame including a first part and a second part each carrying a bearing, the first part or the first and second parts of the frame being elastically deformable. Next, the rotor is mounted in the frame through the lateral aperture therein by increasing the distance between the two bearings of the frame via the elastic deformation of the first part or of the first and second parts of said frame, said elastic deformation being provided in particular for the insertion of the two rotor pivots into the two respective bearings of the pre-formed frame.

15 Claims, 3 Drawing Sheets

(51) Int. Cl.
*G04C 3/14* (2006.01)
*H02K 5/08* (2006.01)
*H02K 7/08* (2006.01)
*H02K 15/16* (2006.01)
*H02K 37/16* (2006.01)

(56) References Cited

U.S. PATENT DOCUMENTS

| | | | |
|---|---|---|---|
| 4,412,144 A | 10/1983 | Denisov et al. | |
| 4,483,627 A * | 11/1984 | Muller et al. | 368/76 |
| 4,684,840 A * | 8/1987 | Bertram et al. | 310/162 |
| 4,725,749 A * | 2/1988 | Wuthrich | 310/49.34 |
| 4,842,425 A | 6/1989 | Betterton et al. | |
| 5,206,554 A | 4/1993 | Perrot | |
| 5,408,151 A | 4/1995 | Perrot et al. | |
| 6,437,464 B1 * | 8/2002 | Neal | 310/43 |

FOREIGN PATENT DOCUMENTS

| | | |
|---|---|---|
| EP | 0 443 403 A1 | 8/1991 |
| EP | 0 607 828 A1 | 7/1994 |
| JP | 2006-226771 | 8/2006 |
| WO | WO 2008/031795 A1 | 3/2008 |

\* cited by examiner

ELECTROMAGNETIC TIMEPIECE MOTOR AND METHOD OF MANUFACTURING THE SAME

This application claims priority from European Patent Application No. 12187676.7 filed Aug. 10, 2012, the entire disclosure of which is incorporated herein by reference.

FIELD OF THE INVENTION

The present invention concerns the field of electronic timepiece movements having an analogue display driven by an electromagnetic motor. More specifically, the invention concerns an electromagnetic timepiece motor and the method of manufacturing the same, in particular the assembly of the permanent magnet rotor in a frame made of non-magnetic material.

BACKGROUND OF THE INVENTION

There is known, in particular from EP Patent No 607 828, an electromagnetic timepiece motor comprising a stator, a rotor and a frame made of synthetic material. This frame comprises two distinct pieces respectively forming a case with two apertures and a cover arranged for closing the first of the two apertures. The first aperture is provided for the insertion of the rotor into the case. The cover includes a bearing. The second aperture is a lateral aperture arranged to enable a wheel to mesh with the pinion of the rotor housed in the frame.

The rotor is assembled in the frame by inserting the rotor into the case through the first aperture until a rotor pivot reaches the bottom of the case, and then further while ensuring that the pivot is aligned with the bearing arranged in the bottom. Next, the cover is provided and fixedly arranged so as to close the first aperture while ensuring that the rotor is held in a centred position so that the second rotor pivot penetrates the cover bearing.

The method of manufacturing the frame-rotor assembly disclosed in EP Patent No 607 828 has several drawbacks. Firstly, the frame must be made in two parts with a closing cover. Further, it is difficult to arrange the rotor in the frame. The insertion of the first pivot into the bearing at the bottom of the case not only requires precise handling of the rotor when it is inserted into the case, but the insertion of the second pivot into the cover bearing poses a serious problem.

There is known from JP Patent No 2006-226771 a timepiece movement with a motor having a rotor whose two pivots are inserted into two respective bearings. The first bearing is formed in one portion of the bottom plate of the movement whereas the second bearing is formed in a portion of a bridge of said movement. The rotor is assembled in a conventional manner, i.e. in a similar manner to the assembly of a wheel between the bottom plate and a bridge. This document proposes to form the parts defining the first and second bearings from flat springs operating as shock absorbers in the event of a shock in the direction of the rotor axis. It will be noted that the assembly of a rotor without a frame is difficult and that the only function of the flat springs is to protect the motor in the event of shocks.

SUMMARY OF THE INVENTION

It is an object of the present invention to overcome the aforementioned problems concerning the assembly of a rotor in a frame and to provide an inexpensive electromagnetic timepiece motor.

The invention therefore concerns an electronic timepiece movement having an electromagnetic motor and an analogue display driven by the electromagnetic motor, said motor being formed of a stator and a rotor housed in a frame made of non-magnetic material mounted in an aperture in the stator, said frame having a lateral aperture. The rotor includes a permanent magnet and at both ends, along the axis of rotation thereof, respectively has two pivots which are respectively pivotally mounted in two bearings respectively arranged in a first part and a second part of the frame. The lateral aperture of the frame has a maximum width at least equal to the maximum diameter of the rotor and the first part or the first and second parts of the frame is/are elastically deformable in the direction of the axis of rotation. This first part or the assembly of the first and second parts has/have a capacity to deform elastically, in the direction defined by the two bearings of the frame, which is sufficient to allow the rotor to be assembled in the frame through the lateral aperture, in particular to allow the two rotor pivots to be inserted into the two bearings.

According to a particular implementation, at least one of the first and second parts forming the frame is an elastically deformable tongue having a free or loose end.

The frame of the electromagnetic motor fitted to the electronic timepiece movement according to the invention may be, in a preferred embodiment, formed by the same single piece made of plastic material having a lateral aperture for the insertion of the rotor. The frame-rotor assembly of this electromagnetic motor may made easily using a manufacturing method which is also the subject of the present invention.

Other particular features of the invention will be explained hereinafter in the detailed description of an embodiment of the invention and of the method of manufacturing a timepiece movement comprising a frame-rotor assembly fitted to a timepiece motor according to the invention.

BRIEF DESCRIPTION OF THE DRAWINGS

The invention will be described below with reference to the annexed drawings, given by way of non-limiting example, and in which.

DETAILED DESCRIPTION OF THE INVENTION

Figure 1:
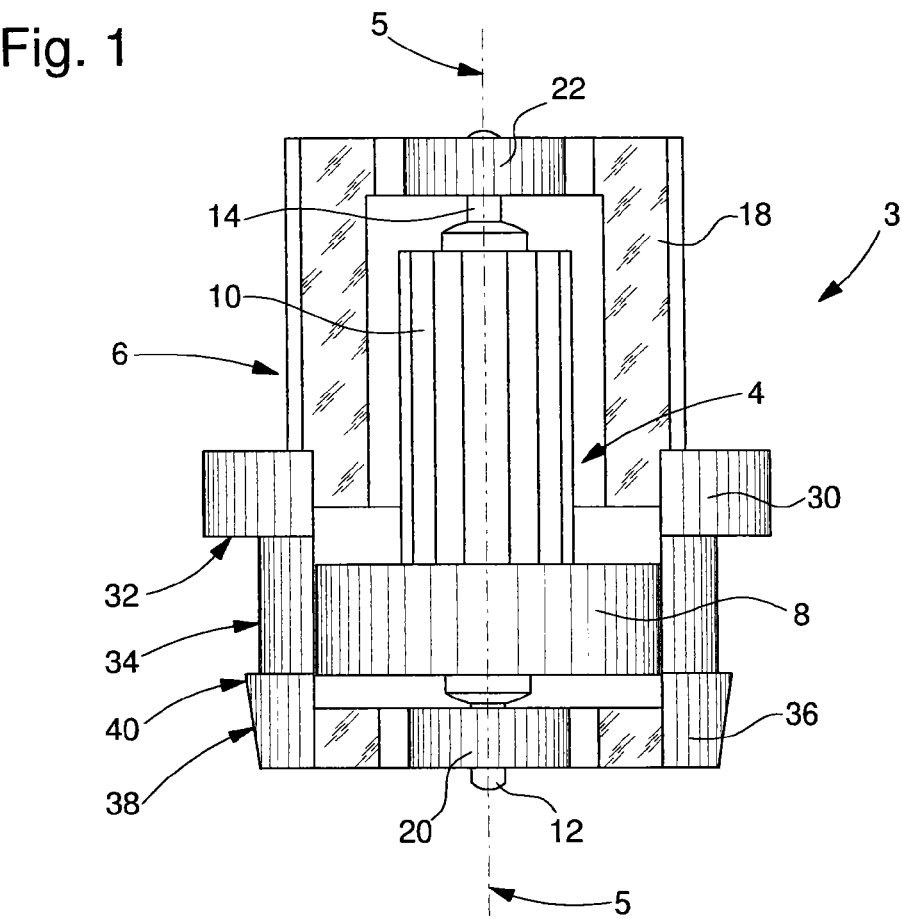
FIG. 1 is a side view of frame-rotor assembly for a timepiece motor according to an embodiment of the invention.
Figure 2:
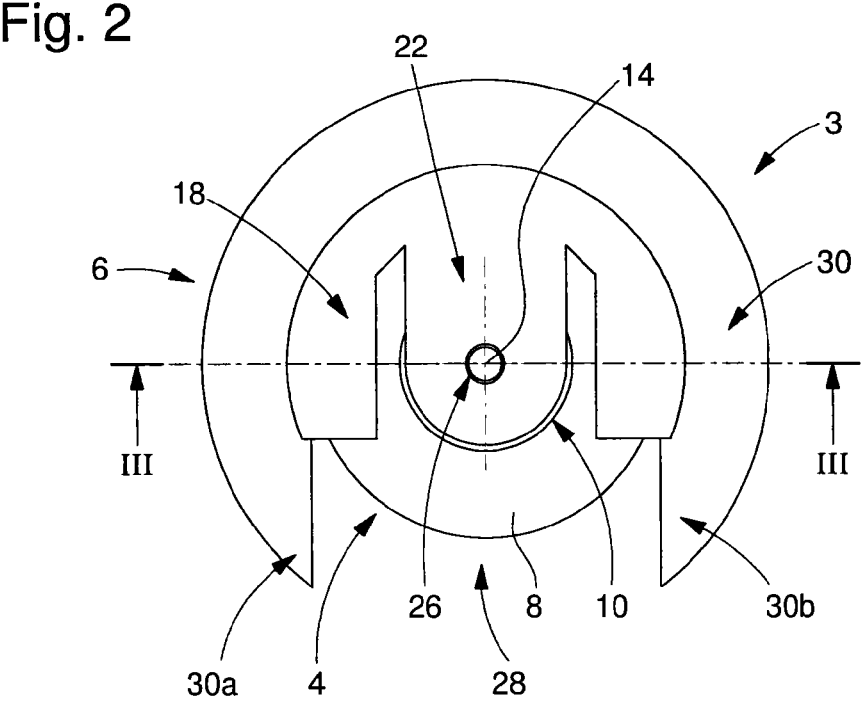
FIG. 2 is a top view of the frame-rotor assembly of FIG. 1.
Figure 3:
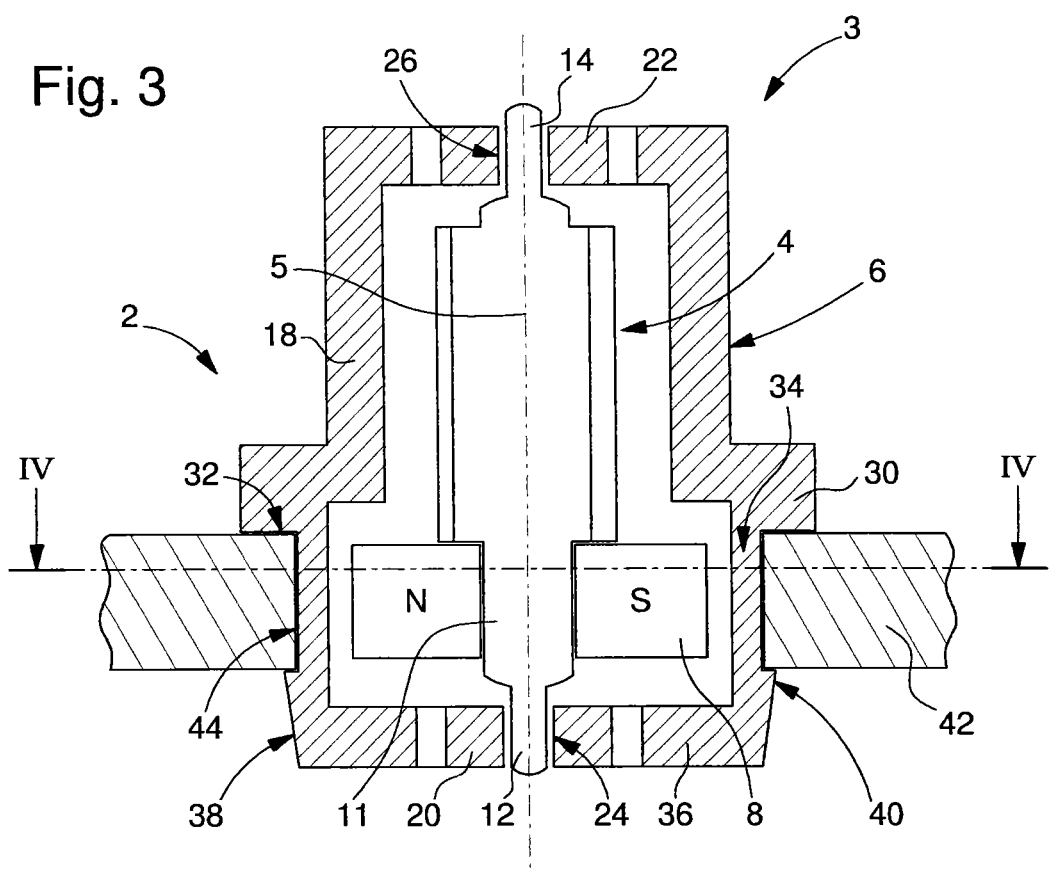
FIG. 3 is a partial longitudinal cross-section of the timepiece motor along line III-III of FIG. 2.
Figure 4:
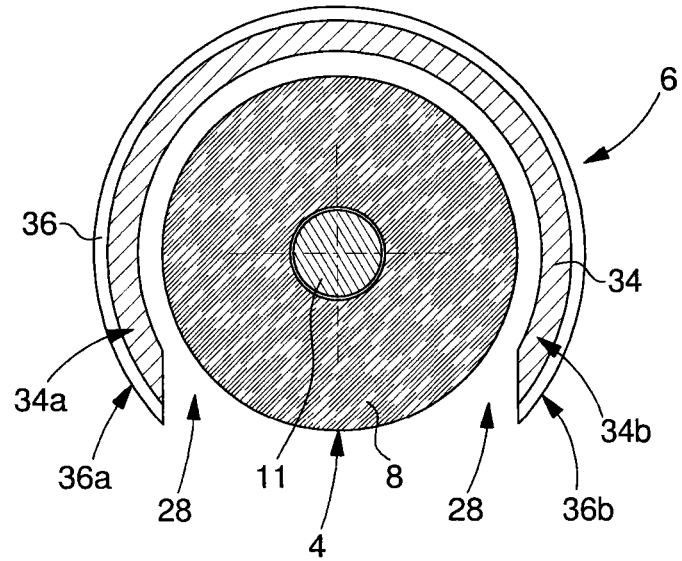
FIG. 4 is a transverse cross-section of the frame-rotor assembly along IV-IV of FIG. 3.

With reference to FIGS. 1 to 4, an embodiment of an electromagnetic timepiece motor 2 according to the invention will be described, in particular the frame-rotor assembly 3 thereof, in addition to the method of manufacturing this type of motor according to the invention.

The electronic timepiece movement according to the invention has an electromagnetic motor 2 and an analogue display (which is conventional and not shown) driven by the electromagnetic motor. Electromagnetic motor 2 includes a stator 42 (FIG. 3) and a rotor 4 housed in a frame 6 made of non-magnetic material mounted in an aperture 44 in the stator. The rotor is formed by an arbour 11 which defines an axis of rotation 5 of the rotor. Arbour 11 carries a permanent magnet 8 and has a pinion 10 at the periphery thereof, above the permanent magnet. At the two ends of arbour 11 there are respectively arranged two pivots 12 and 14, respectively pivotally mounted in two bearings 24 and 26. These two bearings are respectively arranged in a first part 20 and a second part 22 of frame 6. In the variant shown, the two bearings are defined by two holes respectively provided in the first and second parts. In other variants, various embodiments of each bearing could be provided, for example by using a pierced jewel which is driven or bonded in a hole in the frame, with or without a cap jewel.

Frame 6 has a lateral aperture 28, between the first and second parts 20 and 22 to enable the rotor to be assembled in the frame, as will be explained hereinafter, and to enable a wheel set of the timepiece movement to mesh with pinion 10. For this purpose, the top part 18 of the frame defines a cylinder cut along a cutting plane parallel to axis of rotation 5 and substantially tangential to the toothing of pinion 10.

The bottom part of frame 6 is formed of three distinct portions or sections, namely an annular projecting portion 30 defining a stop surface 32 abutting against stator 42 at the periphery of stator hole 44, a circular portion 34 whose height and diameter match those of the stator hole, and a base 36, whose peripheral portion forms a truncated cone, whose lateral surface 38 is defined by a cone distance having a small angle relative to the direction defined by the two bearings, this direction matching that of axis of rotation 5 of the rotor mounted in the frame. At the join with cylindrical portion 34, the truncated cone defines a small shoulder used for fixing the frame to the stator. The frame-rotor assembly 3 is intended to be assembled to stator 42 of the timepiece motor by inserting the frame into an aperture in the stator into a final position where the permanent rotor magnet is substantially located inside the aperture. For the variant embodiment described here, this assembly 3 is forcibly inserted into stator hole 44, with the edge of the hole pressing on lateral surface 38; which elastically deforms base 36 until the stator has passed shoulder 40 and abuts against stop member 32. Base 36 then returns to its original shape and the frame-rotor is fixedly held to the stator. Reference will thus be made to a ratchet and pawl or snap-on mechanism for assembling assembly 3 to stator 42.

It will be noted that portions 30, 34 and 36 each include two end portions 30a, 30b, respectively 34a, 34b and 36a, 36b which extend the respective portions beyond the cutting plane of top part 18. This configuration has the advantage of limiting lateral aperture 28 as far as possible in the bottom part of the frame, this aperture being substantially adjusted to the diameter of permanent magnet 8. Thus, circular portion 34 located in the stator hole has an external surface which extends over considerably more than 180° (see FIG. 4), to ensure that the frame is centred in the stator hole. In general, lateral aperture 28 has a maximum width at least equal to the maximal diameter of rotor 4, and generally matching the diameter of the permanent magnet. It will be noted that, in a variant embodiment, portions 30 and 36 may be inverted, with portion 30 then including the bottom of the frame with tongue 20 and the inclined plane 38 being oriented to define a shoulder which is opposite the annular stop surface 32.

The first and second parts 20 and 22 are respectively formed by a first tongue and a second tongue each having a loose end and both are elastically deformable in the direction defined by the two bearings 24 and 26. These two tongues 20 and 22 are arranged to enable the rotor to be assembled in the frame by moving the two elastically deformable tongues apart, the rotor being inserted between the two tongues until the two rotor pivots are inserted into the two respective bearings. It will be noted that once assembly is complete, the tongues have a shock absorber function and thus define a sort of shock-absorber bearing.

Figure 5:
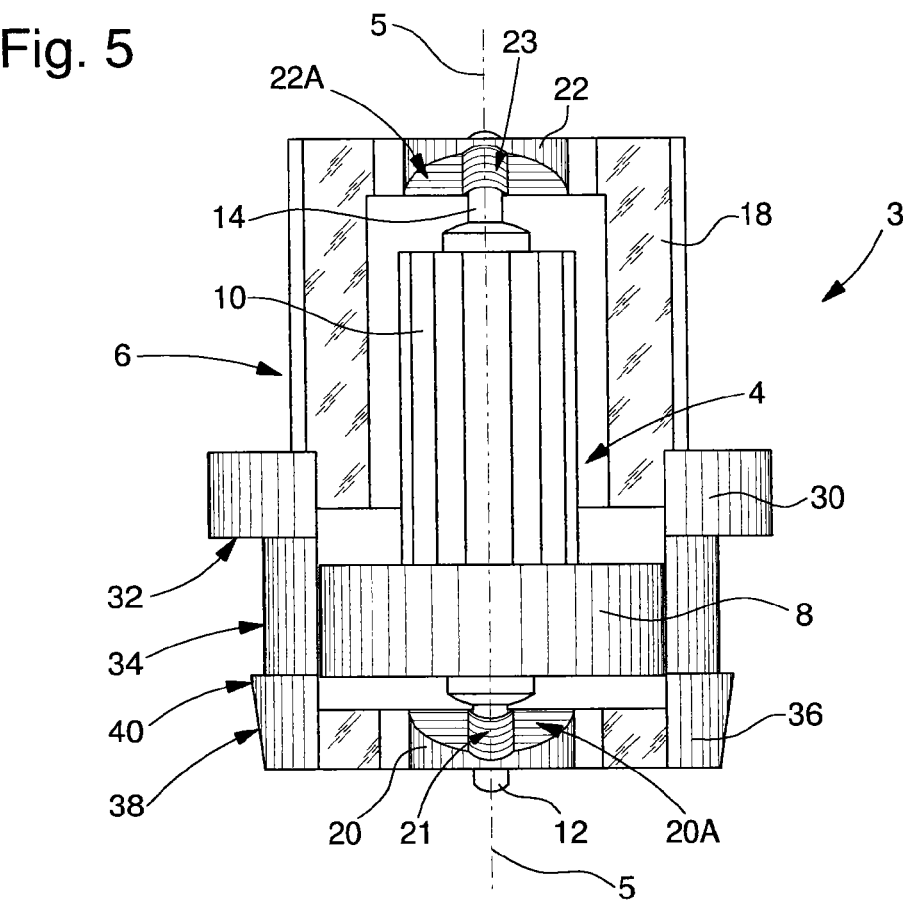
FIG. 5 shows a first variant embodiment of the frame according to the invention.

FIG. 5 shows a variant embodiment. This variant differs in that the two tongues 20 and 22 each have, at the free end thereof, an inclined plane 20A, respectively 22A relative to axis of rotation 5. In another variant, only one of the two tongues has this inclined plane. Moreover, the variant of FIG. 5 provides a groove 21, respectively 23 on each of the two tongues between the lateral aperture of the frame and the two respective bearings arranged in the two tongues. Each groove acts as a guide for a rotor pivot when the rotor is inserted into the frame, so as to ensure that the pivot is led directly into the corresponding bearing. It will be noted that, in general, an inclined plane may be provided, in other variants, at the edge of at least one elastically deformable part among said first and second parts of the frame, i.e. on the side of the lateral aperture in the frame, to facilitate the assembly of the rotor in the frame. It will also be noted that, in general, a groove may be provided, in other variants, in at least one of said first and second parts of the frame between the edge of the part defining said lateral aperture and the bearing arranged in said part. In another variant, the groove is replaced by a recess forming a type of funnel whose mouth is located towards the lateral aperture in the frame whereas the channel, at the other end of the funnel, is located opposite the bearing concerned. Finally, it will be noted that various other variants may be envisaged, particularly a variant having a groove or a recess in at least one of the two parts of the frame which does not have an inclined plane.

In general, according to the invention, the first part or the first and second parts of the frame is/are elastically deformable, said first part or both of said first and second parts having sufficient elastic deformation capacity along the axis of rotation of the rotor to allow, via the elastic deformation of the first part or the first and second parts, the rotor to be inserted into the frame through the lateral aperture therein and the two pivots thereof to be inserted into the two respective bearings of the frame. Thus, in an embodiment which is not shown, only one elastically deformable tongue is provided, one end of which is free, for example top tongue 22. The lower base of the frame then has a bottom formed by a solid disc, which may or may not be cut. In other embodiments, the elastically deformable parts may have various configurations, for example a small disc suspended by several arms connected to the lateral wall of the frame or a bridge. It is also possible to envisage the top and bottom horizontal walls having only a few holes to obtain some elasticity providing sufficient elastic deformation to assemble the rotor in the frame through lateral aperture 28, yet having sufficient rigidity to ensure that the rotor is held in the frame and in particular to ensure that the pivots remain in the bearings of the frame once the electromagnetic motor has been assembled in the electronic timepiece movement. It will also be noted that the elasticity required may also be obtained by varying the thickness of the top and bottom horizontal walls or by selecting suitable material to form these top and bottom horizontal walls and the thickness thereof.

Figure 6:
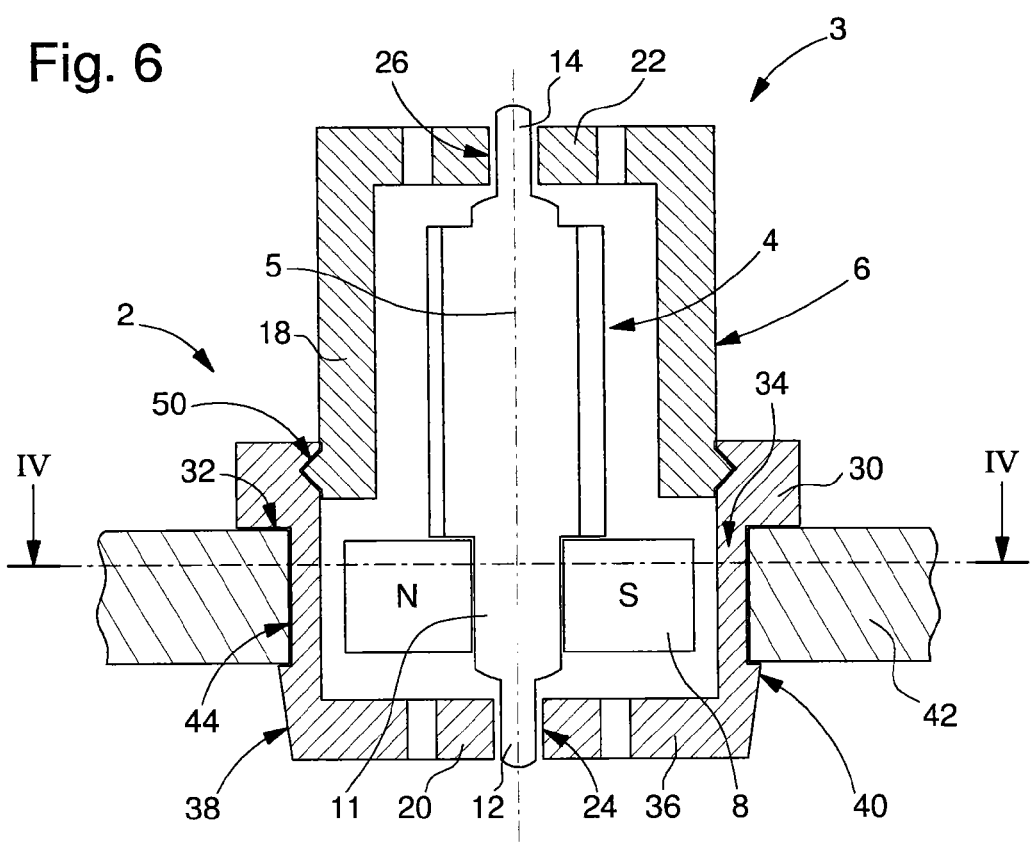
FIG. 6 shows a second variant embodiment of the frame according to the invention.

In the variant embodiment shown in the Figures, the frame is entirely formed by the same single plastic part. This is a preferred variant since the frame may be made in a single step by injection moulding, without assembling the two initially separate parts particularly by welding, bonding, driving in or by a snap fastening. However, the present invention does not preclude the manufacture of a frame by means of several initially separate parts, as shown in FIG. 6. In this latter case, within the scope of this invention, at least the first and second parts respectively including the two bearings are assembled in a preliminary step of assembling the rotor in the frame. In FIG. 6, the top part 18 of the frame is assembled by a ratchet and pawl mechanism or snap fitting to annular part 30. Part 30 has an inner groove 50 into which there is inserted a circular projecting portion of the bottom end of top part 18. According to the invention, a lateral aperture is provided between the two bearings for the assembly of the rotor, which will be explained below. It is possible to envisage adding a part that partially closes this aperture after the rotor pivots have been arranged in the corresponding bearings of the frame, particularly in order to have an uncut circular part in the stator hole; however this increases manufacturing costs.

The present invention is wherein the arrangement of the electromagnetic motor frame allows the implementation of an efficient and straightforward timepiece motor manufacturing method. This method includes the following successive steps:

A) manufacturing a frame 6 made of non-magnetic material having a first part 20 or 22 and a second part 22, respectively 20, in which there are arranged two bearings 24 and 26, said first and second parts being formed by the same single piece or being fixedly assembled to each other, the first part or the first and second parts of the frame being elastically deformable, said frame being made with a lateral aperture 28 whose maximum width is at least equal to the maximum diameter of a rotor intended to be mounted in said frame;

B) taking the rotor comprising two pivots and assembling the rotor in the frame through the lateral aperture therein by increasing the distance between the two bearings of the frame via the elastic deformation of the first part or of the first and second parts of the frame, said elastic deformation being arranged, in particular, to allow the insertion of the two rotor pivots into the two respective bearings of the frame.

In a variant embodiment, as mentioned above, the first and second parts 20 and 22 may initially be formed by two separate pieces which are fixedly assembled (see FIG. 6) before the rotor is inserted into the frame through the lateral aperture therein.

According to a first variant implementation of the method of the invention, the first part 20 and second part 22, respectively defining the first bearing and the second bearing, both have significant capacity for elastic deformation allowing the lateral insertion of the rotor into the frame via the elastic deformation of these first and second parts. Thus, the increase in the space between the two bearings necessary to insert the two rotor pivots into the two bearings is obtained by the deformation of the first and second parts in opposite directions. This means that the elastic deformation can be limited for each of the two parts and thus more rigid parts can be used.

According to a second variant implementation of the method of the invention, only the first part defining the first bearing or the second part defining the second bearing has significant elastic deformation capacity allowing the lateral insertion of the rotor in the frame via the elastic deformation of the first or second part. It will be noted that in a variant embodiment wherein the first and second parts 20 and 22 have some elastic deformation capacity along the axis defined by the two bearings 24 and 26, the assembly of the rotor in the frame may, according to the second variant implementation of the method of the invention, however, be carried out by the significant deformation of only one of the first and second parts. This second variant requires the elastic deformation capacity of the only part deformed during assembly of the rotor to be sufficient to move the two bearings far enough apart to allow the two rotor pivots to be inserted into the two bearings.

According to a preferred variant of the method of the invention, the two pivots are inserted into the two bearings in succession.

Within the scope of the second variant implementation described above, the rotor may be assembled in the frame as follows: The first of the two pivots is inserted into the first of the two bearings and then, by exerting pressure on the first part including the first bearing, this first part is elastically deformed and moved away from the second bearing until the second pivot can be placed opposite the second bearing and finally inserted therein by releasing said pressure.

Within the scope of the first variant implementation described above, the rotor may, for example, be assembled in the frame as follows: The first of the two pivots is inserted into the first of the two bearings and then, by exerting pressure on the first part including the first bearing, said first part is elastically deformed and moved away from the second bearing. Next, the second part including the second bearing is also elastically deformed until the second pivot can be placed or located opposite the second bearing and finally inserted therein by releasing said pressure.

According to a particular implementation, at least one of the first and second parts has, on the side of said lateral aperture, an inclined plane relative to said axis of rotation. In step B), a rotor pivot is placed against said inclined plane and a lateral force is exerted on the rotor so that the pivot exerts pressure on the inclined plane and thus elastically deforms the corresponding part when the pivot moves towards the bearing of said corresponding part and is finally inserted into said bearing. In a specific embodiment, the first and second parts respectively include two tongues at the free end of which there is arranged an inclined plane. This latter variant may be advantageous when the two pivots are substantially simultaneously inserted into the two respective bearings. In this latter case, the rotor is first of all arranged relative to the frame so that its two pivots are abutting against the two respective inclined planes of the two tongues. Next, by exerting a force on the rotor which is perpendicular to the axis of rotation thereof and in the direction of the two bearings of the frame, the two tongues are elastically deformed and the rotor is fitted into lateral aperture 28 of the frame until the two rotor pivots are situated opposite the two respective bearings and finally enter therein.

Finally, according to another particular variant implementation, a groove or a recess defining a type of funnel is made in said first part and/or said second part between said lateral aperture and the respective bearing, said groove or said recess forming a guide for the pivot concerned between the lateral aperture and the corresponding bearing in step B). Thus the assembly of the rotor in the frame is facilitated since at least one of the pivots is guided between the lateral aperture and the corresponding bearing.

What is claimed is:

1. An electronic timepiece movement having an electromagnetic motor and an analogue display driven by said electromagnetic motor, said motor being formed of a stator and of a rotor housed in a frame made of non-magnetic material mounted in an aperture in the stator, the rotor including a permanent magnet and having at both ends, along the axis of rotation thereof, respectively two pivots which are respectively pivotally mounted in two bearings respectively arranged in a first part and a second part of said frame, said frame having a lateral aperture;

wherein said lateral aperture has a maximum width at least equal to the maximum diameter of said rotor, and wherein the first part or the first and second parts of the frame is/are elastically deformable along the direction of said axis of rotation, said first part or said first and second parts together having sufficient elastic deformation capacity to allow the rotor to be assembled in the frame through the lateral aperture therein, in particular to allow the insertion of the two rotor pivots into the two respective bearings.

2. The timepiece movement according to claim 1, wherein at least one of said first and second parts forming said frame is an elastically deformable tongue having one free end.

3. The timepiece movement according to claim 2, wherein at the free end thereof said tongue has an inclined plane relative to said axis of rotation.

4. The timepiece movement according to claim 1, wherein the first and second parts are respectively formed by a first tongue and a second tongue both of which are elastically deformable.

5. The timepiece movement according to claim 1, wherein at least one of said first and second parts has a groove or a recess forming a guide for guiding a rotor pivot to the respective bearing when said rotor is inserted into the frame.

6. The timepiece movement according to claim 1, wherein the two bearings are defined by two holes respectively provided in the first and second parts.

7. The timepiece movement according to claim 1, wherein said frame is entirely formed by the same single piece made of plastic material.

8. A method of manufacturing a timepiece motor including an assembly formed of a frame made of non-magnetic material and of a rotor with a permanent magnet housed in said frame, said assembly being intended to be assembled to a stator of the timepiece motor by inserting said frame into an aperture in said stator into a final position where said permanent magnet is substantially located inside said aperture, wherein said method includes the following successive steps:
   A) manufacturing a frame made of non-magnetic material having a first part and a second part, in which there are respectively arranged two bearings, said first and second parts being formed by the same single piece or being fixedly assembled to each other, the first part or the first and second parts of the frame being elastically deformable along the direction of an axis of rotation defined by the two bearings, said frame being made with a lateral aperture whose maximum width is at least equal to the maximum diameter of said rotor;
   B) taking the rotor comprising two pivots and assembling the rotor in the frame through the lateral aperture therein by increasing the distance between the two bearings of the frame via the elastic deformation of said first part or of the first and second parts of the frame, said elastic deformation being arranged, in particular, to allow the insertion of the two rotor pivots into the two respective bearings of the frame.

9. The method according to claim 8, wherein the two pivots are inserted into the two bearings in succession.

10. The method according to claim 9, wherein the first of the two pivots is inserted into the first of the two bearings, and then, by exerting pressure on the first part including the first bearing, the first part is elastically deformed and moved away from the second bearing until the second pivot can be placed opposite the second bearing and then inserted therein by releasing said pressure.

11. The method according to claim 9, wherein the first of the two pivots is inserted into the first of the two bearings, and then, by exerting pressure on the first part including the first bearing, the first part is elastically deformed and moved away from the second bearing, and wherein the second part including the second bearing is also elastically deformed until the second pivot can be placed or is located opposite the second bearing and then inserted therein by releasing said pressure.

12. The method according to claim 8, wherein at least one of the first and second parts has, on the side of said lateral aperture, an inclined plane relative to said axis of rotation, and wherein, in step B), a rotor pivot is placed against said inclined plane and a lateral force is exerted on the rotor so that the pivot exerts pressure on the inclined plane and thus elastically deforms the corresponding part when the pivot is moved towards the bearing of said corresponding part, and is finally inserted into said bearing.

13. The method according to any of claim 8, wherein at least said first part includes an elastically deformable bridge or tongue.

14. The method according to claim 13, wherein said elastically deformable tongue has a free end on the side of said lateral aperture.

15. The method according to any of claim 8, wherein a groove or a recess defining a type of funnel is made in the first part and/or the second part between said lateral aperture and the corresponding bearing, said groove or said recess forming, in step B), a guide for the pivot concerned between the lateral aperture and the corresponding bearing.

* * * * *